United States Patent [19]
Sugimura

[11] Patent Number: 6,154,830
[45] Date of Patent: Nov. 28, 2000

[54] MICROPROCESSOR

[75] Inventor: Toshio Sugimura, Osaka, Japan

[73] Assignee: Matsushita Electric Industrial Co., Ltd., Osaka, Japan

[21] Appl. No.: 09/190,227

[22] Filed: Nov. 13, 1998

[30] Foreign Application Priority Data

Nov. 14, 1997 [JP] Japan .................................... 9-312967

[51] Int. Cl.⁷ .................................................. G06E 15/00
[52] U.S. Cl. .............................. 712/205; 712/38; 712/35
[58] Field of Search ........................... 711/125; 712/205, 712/35, 34, 38, 42, 43

[56] References Cited

U.S. PATENT DOCUMENTS

| | | | |
|---|---|---|---|
| 5,487,173 | 1/1996 | Greiss et al. ................................ | 712/35 |
| 5,754,878 | 5/1998 | Asghar et al. .............................. | 712/35 |
| 5,768,613 | 6/1998 | Asghar . | |

FOREIGN PATENT DOCUMENTS 05298248  12/1993  Japan .

*Primary Examiner*—Larry D. Donaghue
*Attorney, Agent, or Firm*—McDermott, Will & Emery

[57] ABSTRACT

On a microprocessor chip mounting a central processing unit (CPU) for controlling the entire operation of electronic equipment and a digital signal processor (DSP) for processing a specific signal in the electronic equipment, an instruction cache for temporarily storing a DSP program and a cache controller are additionally mounted, and the DSP program and a CPU program are stored in an externally provided instruction memory. The cache controller controls the DSP to wait and interrupts the CPU when a cache miss occurs. The CPU executes a predetermined interrupt processing routine so as to supplement an instruction block including the instruction code from the instruction memory to the instruction cache. Thus, an on-chip memory used for storing instruction codes to be decoded and executed by the DSP can be reduced.

6 Claims, 4 Drawing Sheets

| x'1000' | MOV R0,R1 |
| x'1001' | ADD R2,R0 |
| x'1002' | SUB R2,x'0' |
| x'1003' | SUB R1,R3 |
| x'1004' | MOV P0,R2 |
| x'1005' | MOV P3,R1 |
| x'1006' | MUL MA(P0),R0 |
| x'1007' | MUL MB(P3),R2 |
| x'1008' | ADD R2,R0 | x'1000'–x'1003': 4 WORDS
x'1004'–x'1007': 4 WORDS

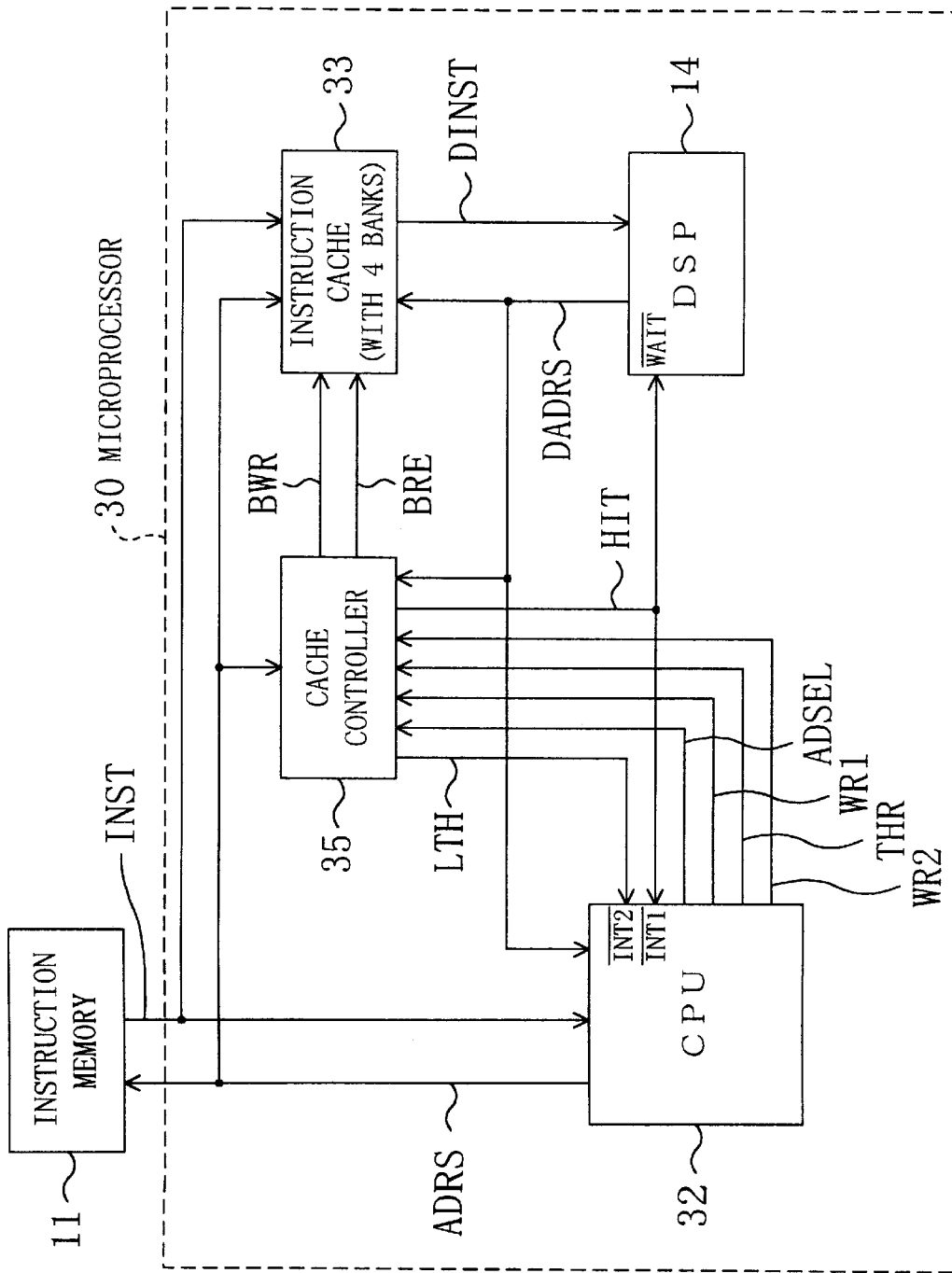

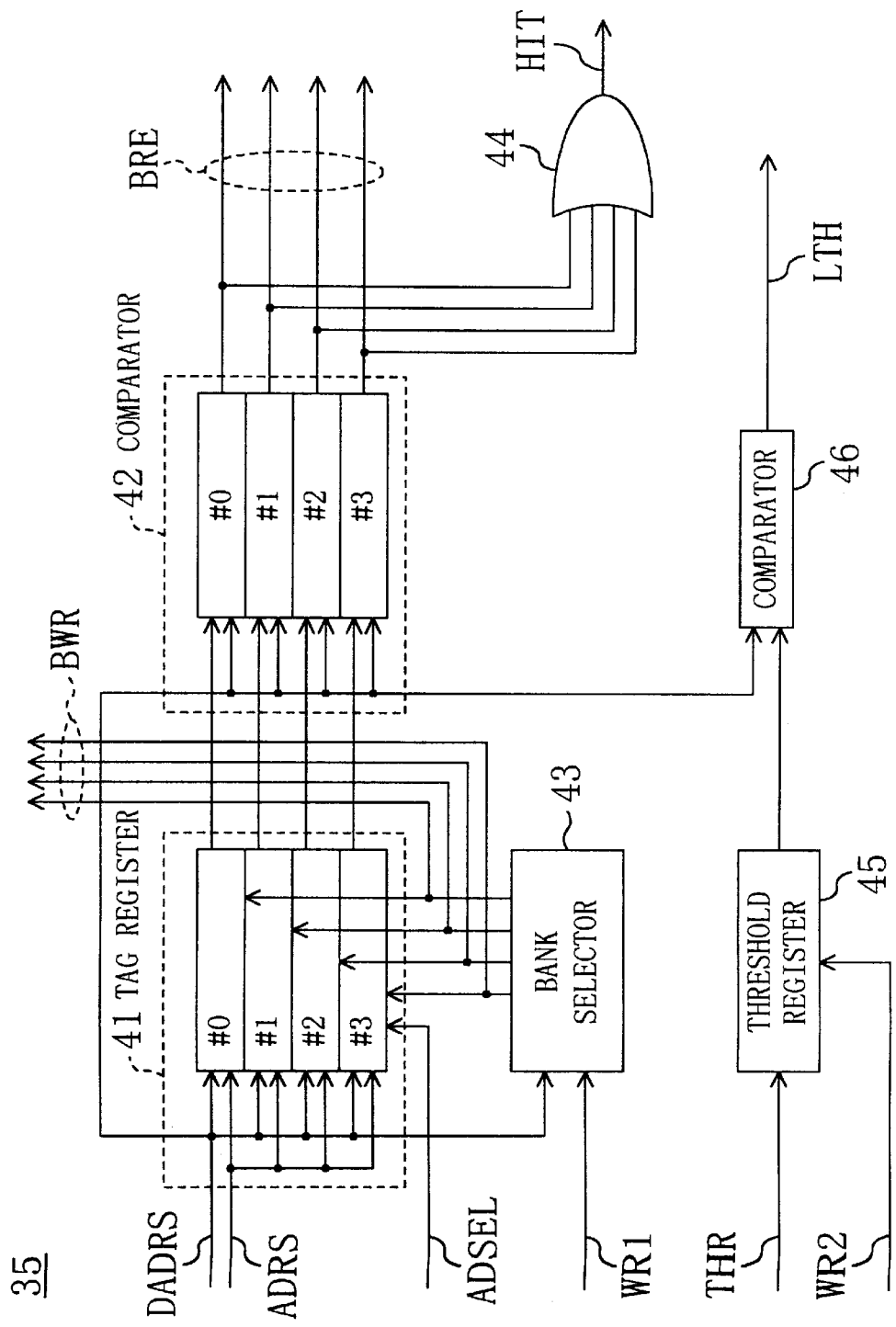

MICROPROCESSOR

BACKGROUND OF THE INVENTION

The present invention relates to a microprocessor including plural instruction execution units.

A communications processor (microprocessor) for use in a cellular telephone disclosed in U.S. Pat. No. 5,768,613 includes two instruction execution units mounted on a single semiconductor chip. A first instruction execution unit is a central processing unit (CPU) for controlling the entire operation of a cellular telephone. A second instruction execution unit is a digital signal processor (DSP) for processing a speech signal in accordance with a predetermined algorithm including multiplication and accumulation, and includes a random access memory (RAM) for storing plural instruction codes.

In a recent cellular telephone, a program for the DSP has become huge in accordance with complication of the speech processing algorithm. Accordingly, the most part of the microprocessor chip is disadvantageously occupied by the RAM included in the DSP.

SUMMARY OF THE INVENTION

The object of the invention is, in a microprocessor chip including a CPU and a DSP, reducing an on-chip memory for storing instruction codes to be decoded and executed by the DSP.

According to the present invention, taking it into consideration that a load on a CPU is smaller than a load on a DSP in some types of applications (including one for cellular telephones), an instruction cache with a small capacity for temporarily storing instruction codes corresponding to part of a DSP program is mounted on a microprocessor chip, and the CPU is used for supplementing instruction codes to the instruction cache.

Specifically, the microprocessor of this invention includes at least two instruction execution units for decoding and executing instruction codes read from an externally provided common instruction memory, and comprises a first instruction execution unit for supplying an address to the instruction memory and for decoding and executing an instruction code read from the instruction memory in accordance with the address; an instruction cache for storing plural instruction codes read from the instruction memory; a second instruction execution unit for supplying an address to the instruction cache and for decoding and executing an instruction code read from the instruction cache in accordance with the address; and a cache controller for determining whether or not the instruction code specified by the address supplied from the second instruction execution unit to the instruction cache is present in the instruction cache, and when the instruction code is not present, for controlling the second instruction execution unit to suspend decoding and execution of the instruction code and controlling the first instruction execution unit to supplement an instruction block including the instruction code from the instruction memory to the instruction cache.

Owing to this configuration, an on-chip memory used for a DSP program can be reduced and the CPU resource can be more effectively used.

BRIEF DESCRIPTION OF THE DRAWINGS

FIG. 3 is a block diagram for showing another exemplified configuration of the microprocessor of the invention;

FIG. 4 is a block diagram for showing the inside configuration of a cache controller of FIG. 3.

DETAILED DESCRIPTION OF THE INVENTION

Figure 1:
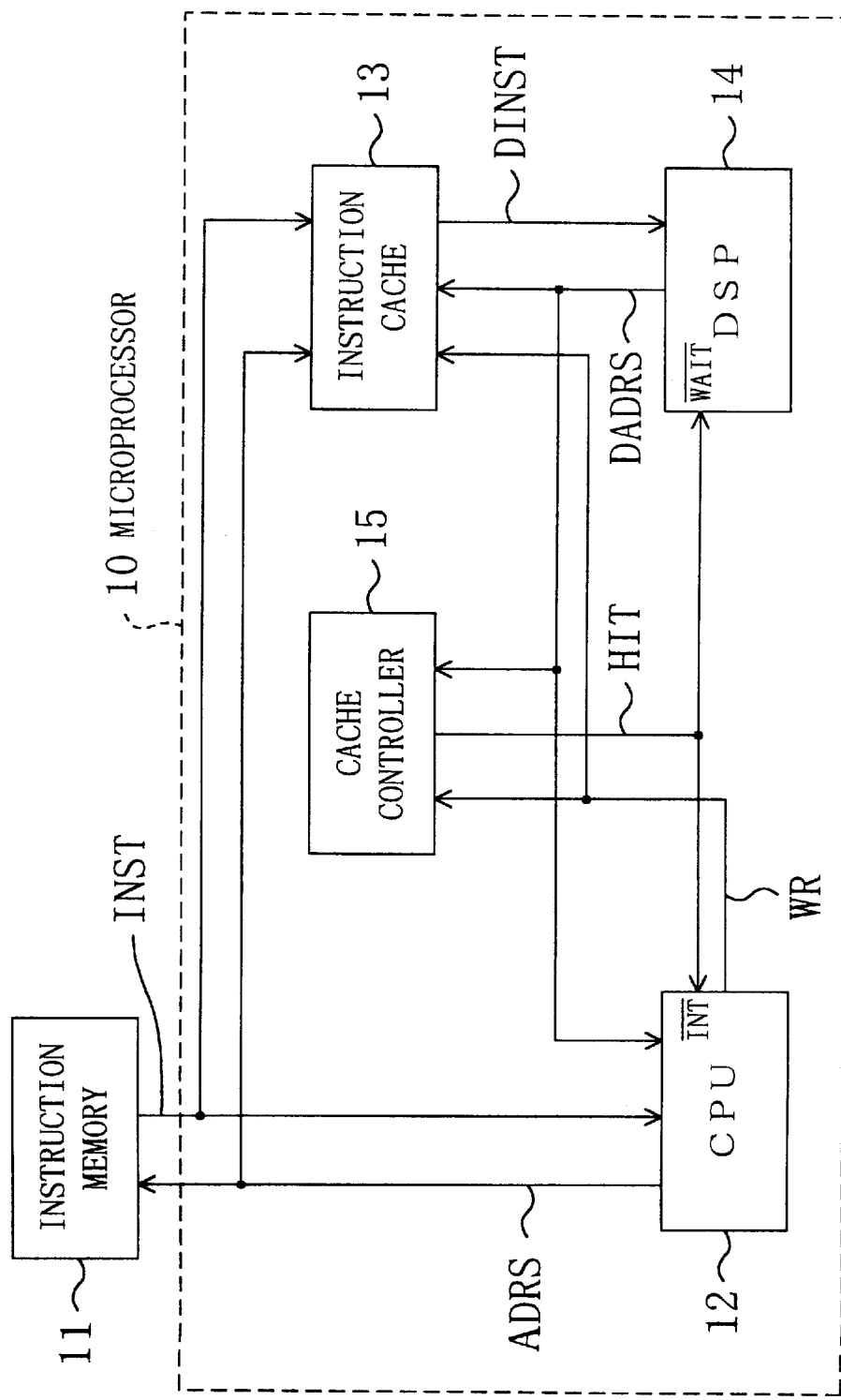
FIG. 1 is a block diagram for showing an exemplified configuration of a microprocessor according to the invention.

FIG. 1 shows an exemplified configuration of a microprocessor for use in a cellular telephone according to the present invention. The microprocessor 10 of FIG. 1 is externally provided with an instruction memory 11 in use, and includes a CPU 12 for controlling the entire operation of the cellular telephone, an instruction cache 13, a DSP 14 for processing a digital speech signal in accordance with a predetermined algorithm, and a cache controller 15, all of which are mounted on a single semiconductor chip. The externally provided instruction memory 11 stores a program to be executed by the CPU 12 and a program to be executed by the DSP 14. The CPU 12 is an instruction execution unit for supplying an address ADRS to the instruction memory 11 and decoding/executing an instruction code INST (on condition that the instruction code is limited to those included in the CPU program) read from the instruction memory 11 in accordance with the address ADRS. The instruction cache 13 is a memory with a small capacity for temporarily storing plural instruction codes INST (on condition that the instruction codes are limited to those included in the DSP program) read from the instruction memory 11. The location in the instruction cache 13 for writing the instruction code INST is specified by the address ADRS supplied from the CPU 12 to the instruction memory 11. The DSP 14 is an instruction execution unit for supplying an address DADRS to the instruction cache 13 and decoding/executing an instruction code DINST read from the instruction cache 13 in accordance with the address DADRS. The cache controller 15 determines whether or not the instruction code specified by the address DADRS supplied from the DSP 14 to the instruction cache 13 is present in the instruction cache 13. When the instruction code is not present in the instruction cache 13, the cache controller 15 controls the DSP 14 to suspend the decoding and execution of the instruction code, and controls the CPU 12 to supplement an instruction block including the instruction code from the instruction memory 11 to the instruction cache 13. Four instruction codes including one specified by the address DADRS are supplied from the instruction cache 13 to the DSP 14 in a batch. Specifically, the instruction codes are read from the instruction cache 13 as an instruction block including four words.

Figures 2, 5:
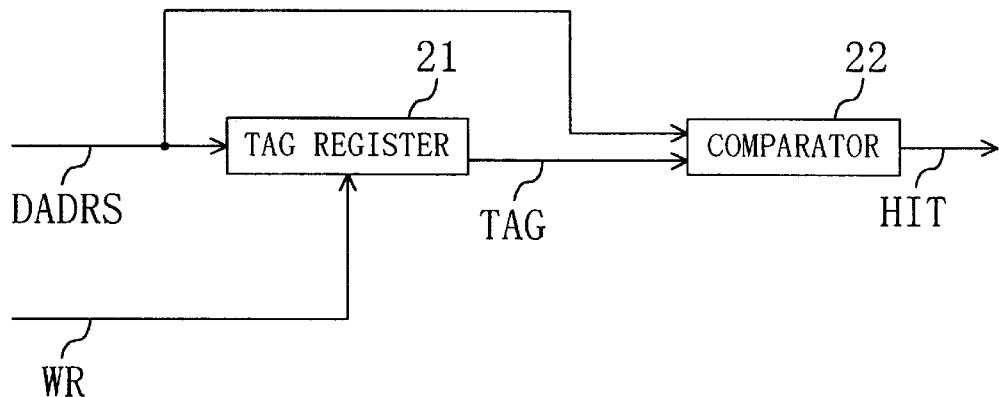
FIG. 2 is a block diagram for showing the inside configuration of a cache controller of FIG. 1.
FIG. 5 is a diagram for showing an example of a program to be executed by a DSP of FIG. 3.

FIG. 2 shows the inside configuration of the cache controller 15 of FIG. 1. The cache controller 15 includes a tag register 21 and a comparator 22. The tag register 21 stores a tag TAG consisting of a high order portion of the address specifying an instruction code present in the instruction cache 13. When an instruction block is supplemented from the instruction memory 11 to the instruction cache 13, the tag register 21 is updated, with reference to the address DADRS supplied from the DSP 14 to the instruction cache 13, in accordance with a write signal WR supplied from the CPU 12 to the tag register 21. The comparator 22 determined whether or not a high order portion of the address DADRS supplied from the DSP 14 to the instruction cache 13 accords with the tag TAG held in the tag register 21. When they accord with each other, the comparator 22 supplies a hit signal HIT with a logical "1" (representing a hit), and when they do not accord with each other, the comparator 22 supplies a hit signal HIT with a logical "0" (representing a miss).

As is shown in FIG. 1, when the hit signal HIT is "0", the DSP 14 is made to wait and the CPU 12 is interrupted. In response to this interrupt, the CPU 12 executes the supplement of the instruction block with reference to the address DADRS supplied from the DSP 14 to the instruction cache 13. The write signal WR output by the CPU 12 is supplied also to the instruction cache 13. The size of an instruction block to be supplemented to the instruction cache 13 depends upon the bit number of the tag TAG.

In the microprocessor 10 having the aforementioned configuration, as far as the hit signal HIT has a logical "1", the CPU 12 decodes and executes the instruction code INST read from the instruction memory 11 in accordance with the address ADRS, and the DSP 14 decodes and executes the instruction code DINST read from the instruction cache 13 in accordance with the address DADRS. When it is determined that the instruction code specified by the address DADRS is not present in the instruction cache 13, the cache controller 15 changes the hit signal HIT to a logical "0". When the hit signal HIT becomes "0" in this manner, the DSP 14 is made to wait and the CPU 12 is interrupted. As a result, the DSP 14 ignores the invalid instruction code DINST read from the instruction cache 13, and continues to supply the same address DADRS. On the other hand, the CPU 12 executes a predetermined interrupt processing routine so as to supplement the instruction block including the instruction code specified by the address DADRS from the instruction memory 11 to the instruction cache 13. At this point, the CPU 12 supplies the write signal WR to the instruction cache 13 and the cache controller 15 before returning to the original CPU program. Accordingly, the supplemented instruction block is written in the instruction cache 13 and the tag register 21 is updated. The cache controller 15 changes the hit signal HIT to a logical "1" again, and at this point, the wait state of the DSP 14 is released.

In this manner, in the microprocessor 10 having the aforementioned configuration, both the CPU program and the DSP program are stored in the externally provided instruction memory 11, and the instruction codes are supplied from the instruction memory 11 to the DSP 14 through the instruction cache 13 with a small capacity for temporary storage. Accordingly, an on-chip memory used for the DSP program can be reduced. As a result, the area of the microprocessor chip can be decreased. Also, since the supplement of the instruction codes to the instruction cache 13 is executed by the CPU 12, the CPU resource can be effectively used. Accordingly, a load on the CPU and a load on the DSP can be equalized. Moreover, not both the CPU 12 and the DSP 14 can directly and independently access the instruction memory 11 but the CPU 12 alone can directly access the instruction memory 11, and therefore, increase in the number of terminals of the instruction memory 11 can be suppressed. Although four words of instruction are simultaneously supplied from the instruction cache 13 to the DSP 14 in the exemplified configuration of FIG. 1. the number of words is not herein specified but can be one, two, three, five or more.

FIG. 3 shows another exemplified configuration of the microprocessor for use in a cellular telephone according to the invention. The microprocessor 30 of FIG. 3 includes a CPU 32, an instruction cache 33 of a 4-bank dual port configuration, a DSP 14, and a cache controller 35, all of which are mounted on a single semiconductor chip. An externally provided instruction memory 11 stores a program to be executed by the CPU 32 and a program to be executed by the DSP 14. The DSP 14 has the same functions as those described with reference to FIG. 1. The CPU 32 has a pre-fetch function described below in addition to the same functions as those of the CPU 12 of FIG. 1. The instruction cache 33 has two independent ports, so that read and write of instruction codes can be executed in parallel. The cache controller 35 has, in addition to the functions of the cache controller 15 of FIG. 1, a function to control the CPU 32 to previously supplement a subsequent instruction block including plural subsequent instruction codes from the instruction memory 11 to the instruction cache 33 in the case where a low order portion of an address DADRS supplied from the DSP 14 to the instruction cache 33 is not smaller than a predetermined threshold value THR. An address ADRS input by the CPU 32 to the instruction memory 11 is supplied not only to the instruction cache 33 but also to the cache controller 35.

FIG. 4 shows the inside configuration of the cache controller 35 of FIG. 3. The cache controller 35 includes a tag register 41, a comparator 42, a bank selector 43, an OR circuit 44, a threshold register 45 and a comparator 46. The tag register 41 includes four registers #0, #1, #2 and #3 respectively corresponding to the four banks included in the instruction cache 33. Each of these four registers stores a tag consisting of a high order portion of the address specifying an instruction code present in the corresponding bank of the instruction cache 33. When an instruction block is supplemented from the instruction memory 11 to the instruction cache 33, these registers are updated with reference to the address DADRS supplied from the DSP 14 to the instruction cache 33 or the address ADRS supplied from the CPU 32 to the instruction memory 11. It is determined which of these addresses is referred to in accordance with an address selecting signal ADSEL supplied from the CPU 32 to the cache controller 35. The bank selector 43 supplies a bank write signal BWR so that one of the registers having the oldest history in the tag register 41 and the corresponding bank of the instruction cache 33 can be updated in response to a first write signal WR1 supplied from the CPU 32. The comparator 42 includes four comparators #0, #1, #2 and #3 respectively corresponding to the four registers included in the tag register 41. Each of these four comparators determines whether or not a high order portion of the address DADRS supplied from the DSP 14 to the instruction cache 33 accords with the tag stored in the corresponding register of the tag register 41. When they accord with each other, the comparator outputs a bank read enable signal BRE with a logical "1" (representing enableness) to the instruction cache 33. When they do not accord with each other, the comparator outputs a bank read enable signal BRE with a logical "0" (representing disableness) to the instruction cache 33. When the bank read enable signal BRE corresponding to any of the banks is "1", the OR gate 44 outputs a hit signal HIT with a logical "1" (representing a hit), and when the bank read enable signals BRE corresponding to all the banks are "0", the OR gate 44 outputs a hit signal HIT with a logical "0" (representing a miss). The threshold register 45 stores a threshold value THR supplied from the CPU 32 in response to a second write signal WR2 supplied from the CPU 32. The comparator 46 compares a predetermined low order portion of the address DADRS supplied from the DSP 14 to the instruction cache 33 with the threshold value THR stored in the threshold register 45. When the low order portion of the address DADRS is smaller than the threshold value THR, the comparator 46 outputs a threshold judgement signal LTH with a logical "1" (representing being small), and when the low order portion is not smaller, the comparator 46 outputs a threshold judgement signal LTH with a logical "0" (representing being large).

As is shown in FIG. 3, when the hit signal HIT is "0", the DSP 14 is made to wait, and a first interrupt occurs in the CPU 32. In response to the first interrupt, the CPU 32 executes a first interrupt processing routine so that an instruction block including the instruction code can be supplemented from the instruction memory 11 to the instruction cache 33 with reference to the address DADRS supplied from the DSP 14 to the instruction cache 33, namely, the address having caused the cache miss. At this point, the CPU 32 not only supplies a first write signal WR1 to the bank selector 43 but also supplies the address selecting signal ADSEL to the tag register 41 so as to update the tag register 41 with reference to the address DADRS supplied from the DSP 14 to the instruction cache 33. It is determined by the bank selector 43 in which of the four banks of the instruction cache 33 the supplemented instruction block is to be written. Since the instruction cache 33 includes the two independent ports so as to conduct the read and the write of the instruction codes in parallel, even when a cache miss occurs, the DSP 14 can decode and execute the instruction code as soon as merely one word of the instruction code specified by the address DADRS demanded by the DSP 14 is stored in the instruction cache 33 as far as the hit signal HIT is rapidly returned to a logical "1" by updating the tag register 41. In other words, all the instruction codes of the one instruction block are not required to be stored in the instruction cache 33 before starting the operation of the DSP 14. Accordingly, the performance degradation of the DSP 14 due to elimination of a built-in RAM can be minimized.

Furthermore, as is shown in FIG. 3, when the threshold judgement signal LTH is "0", a second interrupt occurs in the CPU 32. In response to the second interrupt, the CPU 32 executes a second interrupt processing routine for the prefetch operation, so that a subsequent instruction block including plural subsequent instruction codes can be previously supplemented from the instruction memory 11 to the instruction cache 33 with reference to the address DADRS supplied from the DSP 14 to the instruction cache 33.

FIG. 5 shows an example of the program to be executed by the DSP 14. In FIG. 5, x indicates that the following numerical value is expressed by the hexadecimal notation, and nine instruction codes respectively specified by instruction addresses DADRS 1000 through 1008 are shown.

Now, a specific example of the pre-fetch operation will be described in accordance with the exemplified program of FIG. 5. At this point, the threshold value THR is assumed to be previously set at 10 (binary number), and the lowest significant two bits of an address DADRS is indicated as DBIT. Also, it is assumed that the write of an instruction code in the instruction cache 33 is executed as an instruction block including four words. In this case, when the address DADRS is 1000 or 1001 (hexadecimal number), namely, when the DBIT is 00 or 01 (binary number), the threshold judgement signal LTH is "1" because DBIT<THR. Accordingly, the second interrupt does not occur in the CPU 32. In a subsequent cycle, when the address DADRS becomes 1002 (hexadecimal number), namely, when the DBIT becomes 10 (binary number), the threshold judgement signal LTH is "0" because DBIT$\geq$THR. Accordingly, the second interrupt occurs in the CPU 32. At this point, the CPU 32 executes the second interrupt processing routine, so that an instruction block subsequent to the instruction block including the instruction code specified by the address DADRS (=1002), namely, subsequent four instruction codes starting from an address obtained by adding two to the address DADRS (i.e., an address 1004), can be previously fetched from the instruction memory 11 to the instruction cache 33. At this point, before returning to the original CPU program, the CPU 32 not only supplies the first write signal WR1 to the bank selector 43 but also supplies the address selecting signal ADSEL to the tag register 41 so as to update the tag register 41 with reference to the address ADRS. Thereafter, even when the address DADRS is updated to 1003 (hexadecimal number), the threshold judgement signal LTH is retained at a logical "0" but the CPU 32 accepts no interrupt. Then, when the address DADRS is further updated to 1006 (hexadecimal number), a subsequent instruction block starting from an address 1008 (hexadecimal number) is previously fetched to the instruction cache 33. Since the instruction cache 33 can conduct the read and the write of the instruction codes in parallel, the instruction codes can be read to the DSP 14 even during the pre-fetch operation.

As described so far, the microprocessor 30 having the aforementioned configuration includes the instruction cache 33 provided with plural ports so as to conduct the read and the write of the instruction codes in parallel, and hence, the performance of the instruction cache 33 can be improved as compared with that of FIG. 1. Moreover, the following effects can be attained in addition to the effects described with reference to FIG. 1: Since a subsequent instruction block including plural subsequent instruction codes is previously supplemented from the instruction memory 11 to the instruction cache 33 when a low order portion of the address DADRS supplied from the DSP 14 to the instruction cache 33 is not smaller than the predetermined threshold value THR, the occurrence probability of the cache miss can be decreased, and the operating ratio of the DSP 14 can be improved. Assuming that n is an arbitrary integer, the size of the instruction block supplemented to the instruction cache 33 is $2^n$ words, and the lowest significant n bits of the address DADRS is compared with the threshold value THR of n bits by using the comparator 46.

It goes without saying that the aforementioned microprocessor 10 or 30 is applicable to any electronic equipment application other than a cellular telephone.

What is claimed is:

1. A microprocessor including at least two instruction execution units for decoding and executing instruction codes read from an externally provided common instruction memory, comprising:

a first instruction execution unit for supplying an address to said instruction memory and for decoding and executing an instruction code read from said instruction memory in accordance with said address;

an instruction cache for storing plural instruction codes read from said instruction memory;

a second instruction execution unit for supplying an address to said instruction cache and for decoding and executing an instruction code read from said instruction cache in accordance with said address; and a cache controller for determining whether or not the instruction code specified by said address supplied from said second instruction execution unit to said instruction cache is present in said instruction cache, and when the instruction code is not present, for controlling said second instruction execution unit to suspend decoding and execution of the instruction code and controlling said first instruction execution unit to supplement an instruction block including the instruction code from said instruction memory to said instruction cache.

2. The microprocessor of claim 1, wherein said cache controller includes:

a tag register for storing a tag consisting of a high order portion of an address specifying an instruction code present in said instruction cache; and a comparator for determining whether or not a high order portion of said address supplied from said second instruction execution unit to said instruction cache accords with said tag stored in said tag register, and said tag register is updated by said first instruction execution unit when the instruction block including the instruction code is supplemented from said instruction memory to said instruction cache.

3. The microprocessor of claim 1, wherein said instruction cache includes plural ports for conducting read and write of instruction codes in parallel.

4. The microprocessor of claim 1, wherein said instruction cache includes plural banks, said cache controller includes:

plural tag registers each for storing a tag consisting of a high order portion of an address specifying an instruction code present in the corresponding bank of said instruction cache; and plural comparators respectively corresponding to said plural tag registers for determining whether or not a high order portion of said address supplied from said second instruction execution unit to said instruction cache accords with the tag stored in the corresponding tag register among said plural tag registers, and the corresponding tag register among said plural tag registers is updated by said first instruction execution unit when the instruction block including the instruction code is supplemented from said instruction memory to one of said banks of said instruction cache.

5. The microprocessor of claim 1, wherein said cache controller has a function to control said first instruction execution unit to previously supplement a subsequent instruction block including plural subsequent instruction codes from said instruction memory to said instruction cache when a low order portion of said address supplied from said second instruction execution unit to said instruction cache is not smaller than a predetermined threshold value.

6. The microprocessor of claim 1, wherein said first instruction execution unit is a central processing unit for controlling an entire operation of electronic equipment including said microprocessor, and said second instruction execution unit is a digital signal processor for processing a specific signal in said electronic equipment.

* * * * *